US009666026B1

(12) United States Patent
McLellan et al.

(10) Patent No.: US 9,666,026 B1
(45) Date of Patent: May 30, 2017

(54) SYSTEMS AND METHODS FOR PROVIDING OFFERS WITHIN A GAME SPACE THAT DECREASE IN VALUE BASED ON PREVIOUS ACCEPTANCES OF THE OFFERS

(71) Applicant: KABAM, INC., San Francisco, CA (US)

(72) Inventors: Sam McLellan, San Francisco, CA (US); Luc Pieron, San Francisco, CA (US); Stephanie Schultz, San Francisco, CA (US); Dylan Swift, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 245 days.

(21) Appl. No.: 14/548,430

(22) Filed: Nov. 20, 2014

(51) Int. Cl.
*G06F 17/00* (2006.01)
*G07F 17/32* (2006.01)

(52) U.S. Cl.
CPC ................................ *G07F 17/3244* (2013.01)

(58) Field of Classification Search
USPC ...................................................... 463/16–25
See application file for complete search history.

(56) References Cited

U.S. PATENT DOCUMENTS 5,816,918 A 10/1998 Kelly et al. ..................... 463/16
6,190,255 B1 2/2001 Thomas et al. ................. 463/20
6,306,033 B1 10/2001 Niwa et al. ....................... 463/1
6,347,996 B1 2/2002 Gilmore et al. ................ 463/17
6,375,187 B1 * 4/2002 Baerlocher ......... G07F 17/3262 273/143 R
6,561,904 B2 5/2003 Locke et al. .................... 463/25
6,607,437 B2 8/2003 Casey et al. .................... 463/16
6,811,484 B2 11/2004 Katz et al. ...................... 463/17
7,136,617 B2 11/2006 Libby ........................... 434/350
7,381,133 B2 6/2008 Thomas .......................... 463/20
7,682,239 B2 3/2010 Friedman et al. .............. 463/16

(Continued)

FOREIGN PATENT DOCUMENTS

WO WO 02/26333 4/2002
WO WO 2013/013281 1/2013
WO WO 2013/116904 6/2013

OTHER PUBLICATIONS

Super Mario Bros. 3 Review, Nintendo for NES, Feb. 1990, pp. 1-4.

(Continued)

*Primary Examiner* — Ronald Laneau
(74) *Attorney, Agent, or Firm* — Sheppard Mullin Richter & Hampton LLP

(57) ABSTRACT

Offers provided within a game space may decrease in value based on previous acceptances of the offers. A game instance of a game space may be executed to facilitate presentation of views of the game space to users to enable interaction of the users with the game space and/or each other by performing operations in the game space in response to commands received from the users. Offers may be provided within the game instance of the game space that decrease in value based on previous acceptances of the offers. The offers may include a first offer having a first value that progressively decreases based on an amount of users that have previously accepted the first offer in order to incentivize early acceptance of the first offer.

20 Claims, 3 Drawing Sheets

(56) References Cited

U.S. PATENT DOCUMENTS

| | | | | |
|---|---|---|---|---|
| 7,749,056 | B2 | 7/2010 | Ando et al. | 463/6 |
| 7,785,188 | B2 | 8/2010 | Cannon | 463/20 |
| 7,945,802 | B2 | 5/2011 | Hamilton, II et al. | 713/500 |
| 7,959,507 | B2 | 6/2011 | Cannon | 463/21 |
| 8,010,404 | B1 | 8/2011 | Wu et al. | 705/10 |
| 8,047,909 | B2 | 11/2011 | Walker et al. | 463/16 |
| 8,057,294 | B2 | 11/2011 | Pacey et al. | 463/20 |
| 8,239,487 | B1 | 8/2012 | Hoffman et al. | 709/218 |
| 8,313,372 | B2 | 11/2012 | Naicker et al. | 463/25 |
| 8,317,601 | B1 | 11/2012 | Luciano, Jr. | 463/25 |
| 8,371,925 | B2 | 2/2013 | Bonney et al. | 463/20 |
| 8,376,826 | B2 | 2/2013 | Katz et al. | 463/16 |
| 8,409,015 | B2 | 4/2013 | Van Luchene | 463/42 |
| 8,512,150 | B2 | 8/2013 | Herrmann et al. | 463/43 |
| 8,790,185 | B1 | 7/2014 | Caldarone et al. | 463/42 |
| 8,794,557 | B2 * | 8/2014 | Wu | A47J 42/38 241/169.1 |
| 8,821,260 | B1 | 9/2014 | DeSanti et al. | 463/25 |
| 9,105,146 | B2 * | 8/2015 | Wolf | G07F 17/32 |
| 2002/0072412 | A1 | 6/2002 | Young et al. | 463/42 |
| 2003/0027619 | A1 | 2/2003 | Nicastro, Sr. | 463/16 |
| 2003/0064795 | A1 * | 4/2003 | Baerlocher | G07F 17/32 463/25 |
| 2003/0102625 | A1 | 6/2003 | Katz et al. | 273/138.1 |
| 2005/0020342 | A1 * | 1/2005 | Palmer | G07F 17/32 463/16 |
| 2005/0054413 | A1 * | 3/2005 | Randall | G07F 17/3267 463/16 |
| 2005/0055115 | A1 * | 3/2005 | Gerrard | G07F 17/3262 700/91 |
| 2005/0096117 | A1 | 5/2005 | Katz et al. | 463/17 |
| 2005/0209008 | A1 | 9/2005 | Shimizu et al. | 463/43 |
| 2005/0227751 | A1 | 10/2005 | Zanelli et al. | 463/1 |
| 2005/0277474 | A1 | 12/2005 | Barry | 463/42 |
| 2006/0063587 | A1 | 3/2006 | Manzo | 463/25 |
| 2006/0116196 | A1 | 6/2006 | Vancura | 463/20 |
| 2006/0287029 | A1 | 12/2006 | Yoshinobu et al. | 463/9 |
| 2007/0129139 | A1 | 6/2007 | Nguyen et al. | 463/25 |
| 2008/0058092 | A1 | 3/2008 | Schwartz et al. | 463/25 |
| 2008/0113706 | A1 | 5/2008 | O'Halloran | 463/16 |
| 2008/0207306 | A1 | 8/2008 | Higbie | 463/23 |
| 2008/0227525 | A1 | 9/2008 | Kelly et al. | 463/20 |
| 2008/0300045 | A1 | 12/2008 | Ratcliff | 463/25 |
| 2009/0124353 | A1 | 5/2009 | Collette et al. | 463/25 |
| 2010/0240444 | A1 | 9/2010 | Friedman et al. | 463/25 |
| 2010/0241492 | A1 | 9/2010 | Eglen et al. | 705/10 |
| 2011/0218033 | A1 | 9/2011 | Englman et al. | 463/25 |
| 2011/0263324 | A1 | 10/2011 | Ganetakos et al. | 463/31 |
| 2011/0275438 | A9 | 11/2011 | Hardy et al. | 463/42 |
| 2011/0319152 | A1 | 12/2011 | Ross et al. | 463/20 |
| 2012/0157193 | A1 | 6/2012 | Arezina et al. | 463/25 |
| 2012/0178515 | A1 | 7/2012 | Adams et al. | 463/17 |
| 2012/0202570 | A1 | 8/2012 | Schwartz et al. | 463/10 |
| 2012/0244945 | A1 | 9/2012 | Kolo et al. | 463/42 |
| 2012/0302329 | A1 | 11/2012 | Katz et al. | 463/25 |
| 2013/0072278 | A1 | 3/2013 | Salazar et al. | 463/16 |
| 2013/0095914 | A1 | 4/2013 | Allen et al. | 463/25 |
| 2013/0173393 | A1 | 7/2013 | Calman et al. | 705/14.66 |
| 2013/0210511 | A1 | 8/2013 | LaRocca et al. | 463/12 |
| 2013/0290147 | A1 | 10/2013 | Chandra et al. | 705/27.1 |
| 2013/0303276 | A1 | 11/2013 | Weston et al. | 463/29 |
| 2013/0310164 | A1 | 11/2013 | Walker et al. | 463/26 |
| 2014/0038679 | A1 | 2/2014 | Snow | 463/11 |
| 2014/0087864 | A1 | 3/2014 | Togashi | 463/29 |

OTHER PUBLICATIONS

Super Mario Bros. 3, NES Gameplay, http://www.youtube.com/watch?v=82TL-Acm4ts, 1 page.

Super Mario Bros. 3, StrategyWiki, the video game walkthrough and strategy guide, http://strategywiki.org/wiki/Super_Mario_Bros._3, 4 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

"Quest item—WoWWiki—Your guide to the World of Warcraft", http://www.wowwiki.com/QuestItem, printed Apr. 16, 2014, 1 page.

"Cataclysm Guide: Guild Advancement—Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Gem System—Street Fighter X Tekken, http://www.streetfighter.com/us/sfxtk/features/gem-system, printed Nov. 6, 2012, 6 pages.

Profession—WoWWiki—Your guide to the World of Warcraft, http://www.wowwiki.com/Profession, printed Nov. 6, 2012, 8 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.org/web/20090323171356/http://classic.battle.net/diablo2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

Dreamslayer's Enchanting and Upgrading Guide—With Pictures:D and Explanations, URL: forums.elswordonline.com/Topic5673.aspx [Retrieved Feb. 21, 2013], 10 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

* cited by examiner

SYSTEMS AND METHODS FOR PROVIDING OFFERS WITHIN A GAME SPACE THAT DECREASE IN VALUE BASED ON PREVIOUS ACCEPTANCES OF THE OFFERS

FIELD OF THE DISCLOSURE

This disclosure relates to systems and methods for providing offers within a game space that decrease in value based on previous acceptances of the offers.

BACKGROUND

Many existing contests and/or other offerings such as for virtual items in gaming environments involve repetitive operations. As a result, it can be a challenge to create a sense of urgency, competitiveness, and/or rarity based around the sale chances to win and/or virtual items. While many users may be motivated solely by the rare opportunity of being first to receive a prize, most experienced users will hold off on their purchase under the assumption that there will be additional chances to win and/or purchase at a later time at lower price points.

SUMMARY

One aspect of the disclosure relates to a system configured for providing offers within a game space that decrease in value based on previous acceptances of the offers. In exemplary implementations, in order to better incentivize early adoption in a game space of a contest, virtual item, and/or sale, the system may provide the highest value to those who obtain a chance to win earlier that other users, successfully win a prize earlier that other users, purchase a virtual item earlier that other users, and/or otherwise accept offers earlier that other users.

In some implementations, the system may include a server. The server may be configured to communicate with one or more client computing platforms according to a client/server architecture. The users may access the system and/or a game space via the client computing platforms. The server may be configured to execute computer program instructions. The computer program instructions may include a game component, an offer component, an offer presentation component, and/or other computer program instruction components.

The game component may be configured to execute an instance of the game space in which an online game takes place. The users may interact with game space elements and/or with each other through gameplays provided by the online game. The gameplays may include role-playing, first-person shooter, real-time strategy, turn-based strategy, simulation, music and/or rhythm playing, social interaction, twitching and/or any other gameplays. The users may participate in the instance of the game space by inputting commands to initiate user actions for controlling one or more of game space elements. Upon receiving the user commands initiating the user actions, the game component may be configured to execute the user actions.

The offer component may be configured to provide offers within the game space. Such offers may include one or more of a chance-based offering, an offer is for a virtual item, and/or other offers. A chance-based offering may be an offer for a chance to win a contest where luck plays a part in winning. As described further herein, the offers may decrease in value based on previous acceptances of the offers. For example, the offers may include a given offer having a given value that progressively decreases based on an amount of users that have previously accepted the given offer in order to incentivize early acceptance of the given offer.

In some implementations, a given offer may be a chance-based offering. As such, accepting the given offer may include obtaining a chance to win a prize associated with the given offer based on luck. In some implementations, the prize may be won by a limited number of users. The prize may be won a limited number of times (e.g., a pool of prizes). The prize may be won during a limited time period. The prize may be won by an unlimited number of users for an unlimited time period. In some implementations, a given user may win only once, a given user may win a limited number of times, or a given user may win an unlimited number of times. Other restrictions on winning the prize are contemplated and are within the scope of the disclosure. The prize may include one or more virtual items, one or more user controlled elements, one or more units of a virtual currency, one or more resources, and/or other aspects of the game space.

The amount of users that have previously accepted a given offer may include a number of users that have previously obtained a chance to the win the prize associated with the given offer. Such chances may be obtained with virtual currency, real-world currency, and/or other mechanisms available in the game space. In some implementations, the amount of users that have previously accepted the given offer may be considered a number of users that have previously won the prize.

In some implementations, the value of a given offer may include a quantity associated with the prize. As such, a given user winning the prize may gain more virtual items (or user controlled elements or units of virtual currency or resources or other aspects of the game space) associated with the prize relative to a second user winning the prize after the given user. By way of non-limiting example, to push the initial sale of an exclusive new combat unit, 1,000 units may be one by an initial prize winner. The second player to win may receive 999 units, the third winner may receive 998 units, and so on.

In some implementations, the value of a given offer may include odds of winning the prize. As such, a given user obtaining a chance to win the prize may have better odds of winning relative to another user obtaining a chance to win the prize after the given user. In some implementations, a given user that won the prize may have had better odds of winning relative to another user that won the prize after the given user.

According to some implementations, the value of a given offer may include a price associated with obtaining a chance to win the prize. As such, a given user purchasing a chance may pay less relative to another user purchasing a chance after the given user.

In implementations that do not involve chance-based offerings, a given offer may be for one or more virtual items, one or more controlled elements, one or more units of virtual currency, one or more resources, and/or other aspects of the game space. As such, accepting the given offer may include purchasing the one or more virtual items, one or more controlled elements, one or more units of virtual currency, one or more resources, and/or other aspects of the game space. The amount of users that have previously accepted the given offer may include a number of users that have previously purchased the virtual item.

In implementations that do not involve chance-based offerings, the value of a given offer may include a quantity associated with the offer. For example, a given user purchasing a virtual item may gain more of the virtual item relative to another user purchasing the virtual item after the given user. Similarly, a given user purchasing one or more controlled elements, one or more units of virtual currency, one or more resources, and/or other aspects of the game space may gain more of what was purchased relative to another user making a purchase after the given user.

In implementations that do not involve chance-based offerings, the value of the given offer may include a price associated with the offer. For example, a given user purchasing a virtual item may pay less relative to another user purchasing the virtual item after the given user. Similarly, a given user purchasing one or more controlled elements, one or more units of virtual currency, one or more resources, and/or other aspects of the game space may pay less for what was purchased relative to another user making a purchase after the given user.

In accordance with some implementations, the offers may include a plurality of offers. Individual ones of the plurality of offers may decrease in value based on previous acceptances of other ones of the plurality of offers. By way of non-limiting example, the offers may include a first offer and a second offer such that the value of the first offer may progressively decrease based on an amount of acceptances of either the first offer or the second offer, or an amount of combined acceptances of the first offer and the second offer.

In some implementations, a given offer may decrease in value for one group of users, but the value of the given offer may remain the same for another group of users. A given offer may decrease in value at a first rate for one group of users, and the value of the given offer may decrease at a second rate for another group of users. Different groups of users may be established based on realm, alliance, teams, experience levels, payment levels, subscription levels, and/or other divisions of users.

The decrease in value of a given offer may occur according to various triggers. In some implementations, the decrease in the value of the given offer may occur with individual acceptances of the given offer. For example, responsive to an acceptance, the value may decrease for a successive acceptance. By way of non-limiting example, to push the initial sale of an exclusive new resource, 10 units of the resource may cost 100 units of virtual currency for the first user to accept the offer, 110 units of virtual currency for the second user to accept the offer, 120 units of virtual currency for the third user to accept the offer, and so on.

In some implementations, the decrease in the value of a given offer may be tiered based on successive sets of acceptances. By way of non-limiting example, a first tier may include the first 500 users to accept the given offer, a second tier may include the second 500 users to accept the given offer, and a third tier may include the remaining users to accept the given offer. The value of the given offer may be the higher for the first tier than the second tier, and higher for the second tier than the third tier. The number of tiers, the number of users per tier, and/or the value of the given offer for a given tier may be adjusted to any number or value.

The offer presentation component may be configured to effectuate presentation of visual indications of offers and/or offer statuses to individual users. In some implementations, a given visual indication may convey information associated with a decrease of value of the given offer. The information associated with the decrease of value of the given offer may include a visual illustration of a decreasing pool of chances to win, prizes, and/or virtual items associated with the given offer. The indication may be presented until the pool is depleted or has breached a threshold. The information associated with the decrease of value of the given offer may include an indication of a total number of users that have accepted the given offer. The information associated with the decrease of value of the given offer may include an indication of a total number of remaining chances to win, prizes, or virtual items associated with the given offer.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
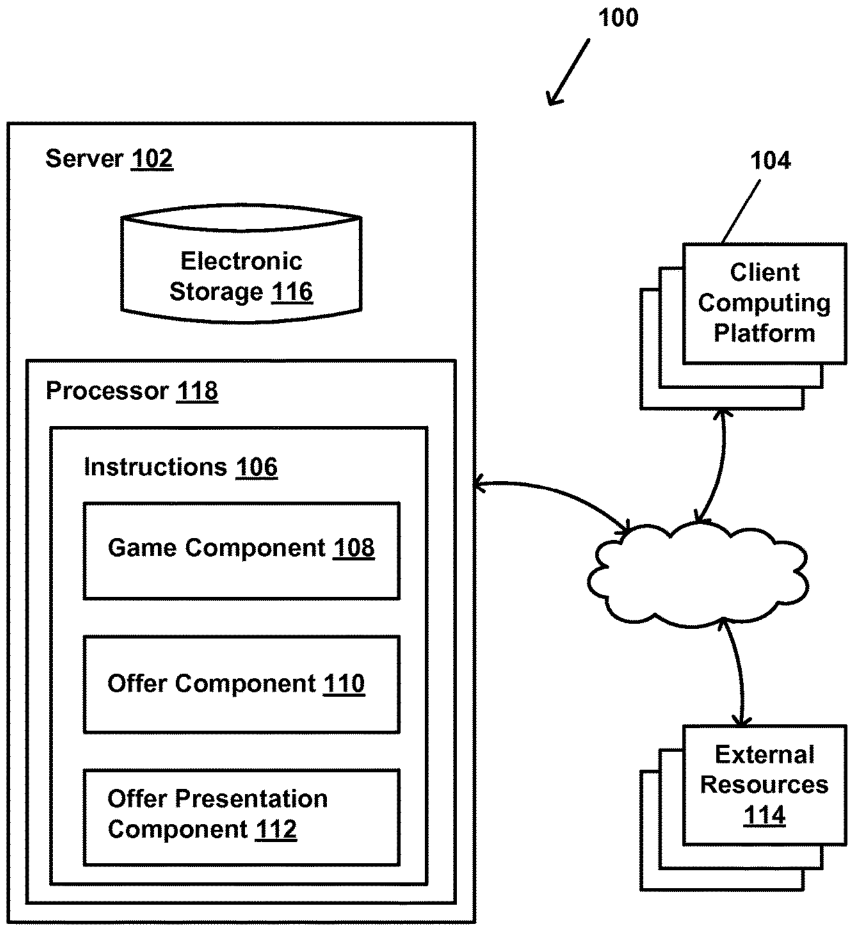
FIG. 1 illustrates a system configured for providing offers within a game space that decrease in value based on previous acceptances of the offers, in accordance with one or more implementations.

FIG. 1 illustrates a system 100 configured for providing offers within a game space that decrease in value based on previous acceptances of the offers, in accordance with one or more implementations. In some implementations, system 100 may include a server 102. The server 100 may be configured to communicate with one or more client computing platforms 104 according to a client/server architecture. The users may access system 100 and/or a game space via the client computing platforms 104. The server 102 may be configured to execute computer program instructions 106. The computer program instructions 106 may include a game component 108, an offer component 110, an offer presentation component 112, and/or other computer program instruction components.

The game component 108 may be configured to execute an instance of the game space in which an online game takes place. Within the instance of the game space, the users may participate in the game space to experience gameplays provided by the online game. The gameplays may include role-playing, first-person shooter, real-time strategy, turn-based strategy, simulation, music or rhythm playing, social interaction, twitching and/or any other gameplays. For facilitating the user participation in the game space, the game component 108 may be configured to determine states of the game space communicated (e.g., via streaming visual data, via object/position data, and/or other state information) from server 102 to client computing platforms 104 for presentation to users. A given game space state determined and transmitted to a given client computing platform 104 may correspond to a view for a user character being controlled by a user via the given client computing platform 104 at a point of time in the game space. The given state determined and transmitted to a given client computing platform 104 may correspond to a location in the game space. The view described by the given state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space may comprise a simulated space that is accessible by users via clients (e.g., client computing platforms 104) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer readable instruction components may be synchronous, asynchronous, and/or semi-synchronous.

The instance of the game space and/or the game that takes place therein may be persistent. That is, the game space and/or the game may continue on whether or not individual players are currently logged in and/or participating in the game. A player that logs out of the game space and then logs back in some time later may find the game space has been changed through the interactions of other players with the game space during the time the player was logged out. These changes may include changes to the simulated physical space, changes in the player's inventory, changes in other players' inventories, changes experienced by non-player characters, and/or other changes.

The instance of the game space may comprise automatically controlled entities not associated with any user. As such, the automatically controlled game space entities may be generated, controlled, evolved, customized, developed and/or otherwise provided by artificial intelligence configured into the server 102 by a provider, administrator, moderator, and/or any other entities related to the game space. The automatically controlled game space entities interact with entities controlled by or associated with the users, other automatically controlled game space entities and as well as the topography of the game space. Certain traits, attributes and/or characteristics may be manifested by, possessed by and/or otherwise associated with the automatically controlled entities and evolved in the game space in accordance with the artificial intelligence. As an illustration, such evolving characteristics of the automatically controlled game space entities may include skills, abilities, powers, strength, stamina, physical appearances such as age, attire, facial expression, speech style and pattern, response style in reaction to user's interaction, gesture and/or any other traits. Examples of the automatically controlled game space entities may include game space characters, objects, components of the topography, game space phenomena (e.g., rains, storms, snow), and/or any other automatically controlled game space elements. As used herein, such automatically controlled game space entities in the instance of the game space are referred to as "AI entities".

The above description of the manner in which state of the game space is determined by game component 108 is not intended to be limiting. The game component 108 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game component 108, the users may participate in the instance of the game space by controlling one or more of an element in the game space. The user controlled elements may include user controlled entities such as avatars, characters, units (e.g., troops) and/or any other user controlled entities, controlled objects such as weaponry, vehicle, artillery, medicine, decorative items and/or any other user controlled game space objects, simulated physical phenomena such as wind, rain, earthquakes, and/or other phenomena, and/or other user controlled elements. The user controlled avatars may represent the users in the game space. The user controlled characters (herein referred to as "user characters") may include heroes, knights, commanders, leaders, generals and/or any other individualized characters that may be trained, recruited, captured, and/or otherwise acquired by the users. The game space units controlled by the user may include troops, cohorts, and/or any other game space entities that may be trained, recruited, captured, and/or otherwise acquired by the users in groups or en mass. Unlike user characters, individual members of a game space unit controlled by a given user may not be individualized (e.g., they may share attributes associated with the unit of the troop).

In any case, the user controlled elements may move through and interact with the game space (e.g., AI entities, elements controlled by other users and/or topography in the game space). The elements controlled by a given user may be created and/or customized by the given user. The given user may have an "inventory" of virtual items (e.g., virtual goods and/or currency) that the given user can use (e.g., by manipulation of a user character or other user controlled elements, and/or other items) within the game space.

Controls of virtual elements may be exercised through commands input by the users through client computing platforms 104. The users may interact with each other through communications exchanged within the game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 108).

A given user may input commands with specific parameters through a client computing platform 104 associated with the given user to initiate user actions or sphere of actions, to under specific deeds, to perform functions and/or initiate any other types of interactions within the game space or with other users. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other game space locations controlled by or associated with the users, craft or transport virtual items, interact with, compete against or along with AI entities and/or game space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the game space. In some examples, the given user may input commands to compete against elements in an environment within the game space (i.e., PvE activities). In some examples, the given user may input commands to compete against each other within the game space (i.e., PvP activities).

The game component 108 may be configured to execute user actions to facilitate interaction of the users with the game space and/or each other in response to receiving game space commands input by the users. Execution of the user actions by the game component 108 may produce changes to the game space state, which may reflect progresses and/or results of the user actions. In some examples, state changes caused by the execution of the user actions may be recorded in the electronic storage 116 to facilitate persistency throughout the instance of the game space. In some examples, execution of the user actions may not produce persistent changes to the game space state (e.g., a user character jumping forward and backward successively may not produce any perceivable game state changes to other users).

Within the instance of the game space, virtual currencies may be provided to store and/or exchange of game space values. Units of the virtual currencies (for example, a gold, a gem, a silver, a coin, a token, and/or any other types of virtual currencies) may reflect game space values as determined by a provider, administrator, moderator, user, and/or any other entities related to the game space. Through one or more units of virtual currencies, game space values may be captured, stored, and circulated in the game space. As one non-limiting example, combinations of user actions, skills, virtual items, time, and/or any other game space elements may be captured, stored, and circulated through virtual currencies to reflect the game space values created by user labor in interacting with the game space. For instance, a user may be provided 1000 gems after prospecting and mining for the gems in the game space for a period of time with certain required mining equipment operable only by a skilled game space miner, which the user has expanded labor to become.

Within the instance of the game space, the virtual currencies may be collected, earned, purchased, gifted, and/or otherwise acquired by the users. For example, the users may purchase the virtual currencies with real-world money consideration (e.g., credit payment through credit card, electronic vouchers provided by the provider of the game space, physical tokens, and/or any other types of real-world currencies) through a virtual store. The users may earn the virtual currencies, for example, through gameplays provided in the game space (e.g., PvP activities, PvE actives, in game tournament, task, quest, mission, and/or any other gameplays in the game space). By way of a non-limiting example, a given user may earn a predetermined amount of virtual currencies after completing an in-game task in the game space. In some examples, the provider of the game space may simply make certain amount of virtual currencies available, for instance through treasure troves in the game space such that the users may gratuitously collect the virtual currencies by exploring for the treasure troves. The users may acquire virtual currencies by receiving gifts that comprise virtual currencies from other users. One of ordinary skills in the art will appreciate that there are other ways to for the users to acquire virtual currencies in the game space.

Within the instance of game space, virtual currencies may be consumed by users to facilitate interactions with the game space. For example, a user may spend virtual currencies to obtain a chance to win a contest, purchase a virtual item, and/or otherwise accept offers presented in the game space via offer component 110.

Within the instance of the game space executed by game component 108, resources may be, for example, generated, cultivated, mined, harvested, purchased, earned, consumed, traded and/or gifted over time by units, characters, pets, buildings, facilities and/or any other infrastructure or entity in the game space for the user. Resources may be prospected. Resources may be virtual items of value that can be accumulated through participation in the game space, rather than virtual currencies that store values in the game space as described above. As such, resources may be used to satisfy resource requirements in the game space. By way of non-limiting examples, game space resources may include food (e.g., rice, fish, wheat, etc.), wood, minerals (e.g., good, iron, ore, coal, oil, stone, crystal, etc.), plants, animals, and/or any other resources appropriate for the game space. Transfer of resources between users may be reflected through user inventories such that the transferor user's inventory reduces an amount of the transferred resources that are added to the transferee user.

The offer component 110 may be configured to provide offers within the game space. Such offers may include one or more of a chance-based offering, an offer is for a virtual item, and/or other offers. A chance-based offering may be an offer for a chance to win a contest where luck plays a part in winning. As described further herein, the offers may decrease in value based on previous acceptances of the offers. For example, the offers may include a given offer having a given value that progressively decreases based on an amount of users that have previously accepted the given offer in order to incentivize early acceptance of the given offer.

In some implementations, a given offer may be a chance-based offering. As such, accepting the given offer may include obtaining a chance to win a prize associated with the given offer based on luck. In some implementations, the prize may be won by a limited number of users. The prize may be won a limited number of times (e.g., a pool of prizes). The prize may be won during a limited time period. The prize may be won by an unlimited number of users for an unlimited time period. In some implementations, a given user may win only once, a given user may win a limited number of times, or a given user may win an unlimited number of times. Other restrictions on winning the prize are contemplated and are within the scope of the disclosure. The prize may include one or more virtual items, one or more user controlled elements, one or more units of a virtual currency, one or more resources, and/or other aspects of the game space.

The amount of users that have previously accepted a given offer may include a number of users that have previously obtained a chance to the win the prize associated with the given offer. Such chances may be obtained with virtual currency, real-world currency, and/or other mechanisms available in the game space. In some implementations, the amount of users that have previously accepted the given offer may be considered a number of users that have previously won the prize.

In some implementations, the value of a given offer may include a quantity associated with the prize. As such, a given user winning the prize may gain more virtual items (or user controlled elements or units of virtual currency or resources or other aspects of the game space) associated with the prize relative to a second user winning the prize after the given user. By way of non-limiting example, to push the initial sale of an exclusive new combat unit, 1,000 units may be one by an initial prize winner. The second player to win may receive 999 units, the third winner may receive 998 units, and so on.

In some implementations, the value of a given offer may include odds of winning the prize. As such, a given user obtaining a chance to win the prize may have better odds of winning relative to another user obtaining a chance to win the prize after the given user. In some implementations, a given user that won the prize may have had better odds of winning relative to another user that won the prize after the given user.

According to some implementations, the value of a given offer may include a price associated with obtaining a chance to win the prize. As such, a given user purchasing a chance may pay less relative to another user purchasing a chance after the given user.

In implementations that do not involve chance-based offerings, a given offer may be for one or more virtual items, one or more controlled elements, one or more units of virtual currency, one or more resources, and/or other aspects of the game space. As such, accepting the given offer may include purchasing the one or more virtual items, one or more controlled elements, one or more units of virtual currency, one or more resources, and/or other aspects of the game space. The amount of users that have previously accepted the given offer may include a number of users that have previously purchased the virtual item.

In implementations that do not involve chance-based offerings, the value of a given offer may include a quantity associated with the offer. For example, a given user purchasing a virtual item may gain more of the virtual item relative to another user purchasing the virtual item after the given user. Similarly, a given user purchasing one or more controlled elements, one or more units of virtual currency, one or more resources, and/or other aspects of the game space may gain more of what was purchased relative to another user making a purchase after the given user.

In implementations that do not involve chance-based offerings, the value of the given offer may include a price associated with the offer. For example, a given user purchasing a virtual item may pay less relative to another user purchasing the virtual item after the given user. Similarly, a given user purchasing one or more controlled elements, one or more units of virtual currency, one or more resources, and/or other aspects of the game space may pay less for what was purchased relative to another user making a purchase after the given user.

In accordance with some implementations, the offers may include a plurality of offers. Individual ones of the plurality of offers may decrease in value based on previous acceptances of other ones of the plurality of offers. By way of non-limiting example, the offers may include a first offer and a second offer such that the value of the first offer may progressively decrease based on an amount of acceptances of either the first offer or the second offer, or an amount of combined acceptances of the first offer and the second offer.

In some implementations, a given offer may decrease in value for one group of users, but the value of the given offer may remain the same for another group of users. A given offer may decrease in value at a first rate for one group of users, and the value of the given offer may decrease at a second rate for another group of users. Different groups of users may be established based on realm, alliance, teams, experience levels, payment levels, subscription levels, and/or other divisions of users.

The decrease in value of a given offer may occur according to various triggers. In some implementations, the decrease in the value of the given offer may occur with individual acceptances of the given offer. For example, responsive to an acceptance, the value may decrease for a successive acceptance. By way of non-limiting example, to push the initial sale of an exclusive new resource, 10 units of the resource may cost 100 units of virtual currency for the first user to accept the offer, 110 units of virtual currency for the second user to accept the offer, 120 units of virtual currency for the third user to accept the offer, and so on.

In some implementations, the decrease in the value of a given offer may be tiered based on successive sets of acceptances. By way of non-limiting example, a first tier may include the first 500 users to accept the given offer, a second tier may include the second 500 users to accept the given offer, and a third tier may include the remaining users to accept the given offer. The value of the given offer may be the higher for the first tier than the second tier, and higher for the second tier than the third tier. The number of tiers, the number of users per tier, and/or the value of the given offer for a given tier may be adjusted to any number or value.

Figure 2:
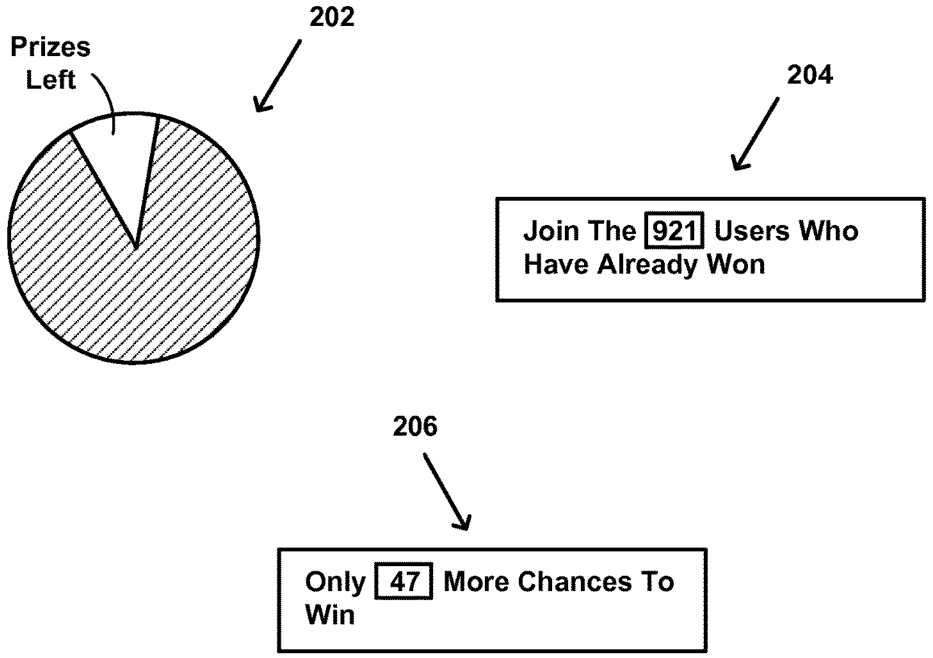
FIG. 2 illustrates exemplary visual indications of offers presented to users of the game conveying information associated with decreasing value of the offers, in accordance with one or more implementations.

The offer presentation component 112 may be configured to effectuate presentation of visual indications of offers and/or offer statuses to individual users. FIG. 2 illustrates exemplary implementations of such visual indications. In some implementations, a given visual indication may convey information associated with a decrease of value of the given offer. The information associated with the decrease of value of the given offer may include a visual illustration of a decreasing pool of chances to win, prizes, and/or virtual items associated with the given offer (see, e.g., indication 202 in FIG. 2). The indication may be presented until the pool is depleted or has breached a threshold. The information associated with the decrease of value of the given offer may include an indication of a total number of users that have accepted the given offer (see, e.g., indication 204 in FIG. 2). The information associated with the decrease of value of the given offer may include an indication of a total number of remaining chances to win, prizes, or virtual items associated with the given offer (see, e.g., indication 206 in FIG. 2).

Referring again to FIG. 1, server 102, client computing platforms 104, and/or external resources 114 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 114 may be operatively linked via some other communication media.

A given client computing platform 104 may include one or more processors configured to execute computer readable instruction components. The computer program readable instruction components may be configured to enable an expert or user associated with the given client computing platform 104 to interface with system 100 and/or external resources 114, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 114 may include sources of information, hosts and/or providers of virtual environments outside of system 100, external entities participating with system 100, and/or other resources. In some implementations, some or all of the functionality attributed herein to external resources 114 may be provided by resources included in system 100.

The server 102 may include electronic storage 116, one or more processors 118, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 116 may comprise electronic storage media that electronically stores information. The electronic storage media of electronic storage 116 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor 118, information received from server 102, information received from client computing platforms 104, and/or other information that enables server 102 to function as described herein.

Processor(s) 118 is configured to provide information processing capabilities in server 102. As such, processor 118 may include one or more of a digital processor, an analog processor, a digital circuit designed to process information, an analog circuit designed to process information, a state machine, and/or other mechanisms for electronically processing information. Although processor 118 is shown in FIG. 1 as a single entity, this is for illustrative purposes only. In some implementations, processor 118 may include a plurality of processing units. These processing units may be physically located within the same device, or processor 118 may represent processing functionality of a plurality of devices operating in coordination. The processor 118 may be configured to execute components 108, 110, 112, and/or other computer readable instruction components. Processor 118 may be configured to execute components 108, 110, 112, and/or other computer readable instruction components by software; hardware; firmware; some combination of software, hardware, and/or firmware; and/or other mechanisms for configuring processing capabilities on processor 118.

It should be appreciated that although components 108, 110, and 112 are illustrated in FIG. 1 as being co-located within a single processing unit, in implementations in which processor 118 includes multiple processing units, one or more of components 108, 110, and/or 112 may be located remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor 118 may be configured to execute one or more additional components that may perform some or all of the functionality attributed below to one of components 108, 110, and/or 112.

Figure 3:
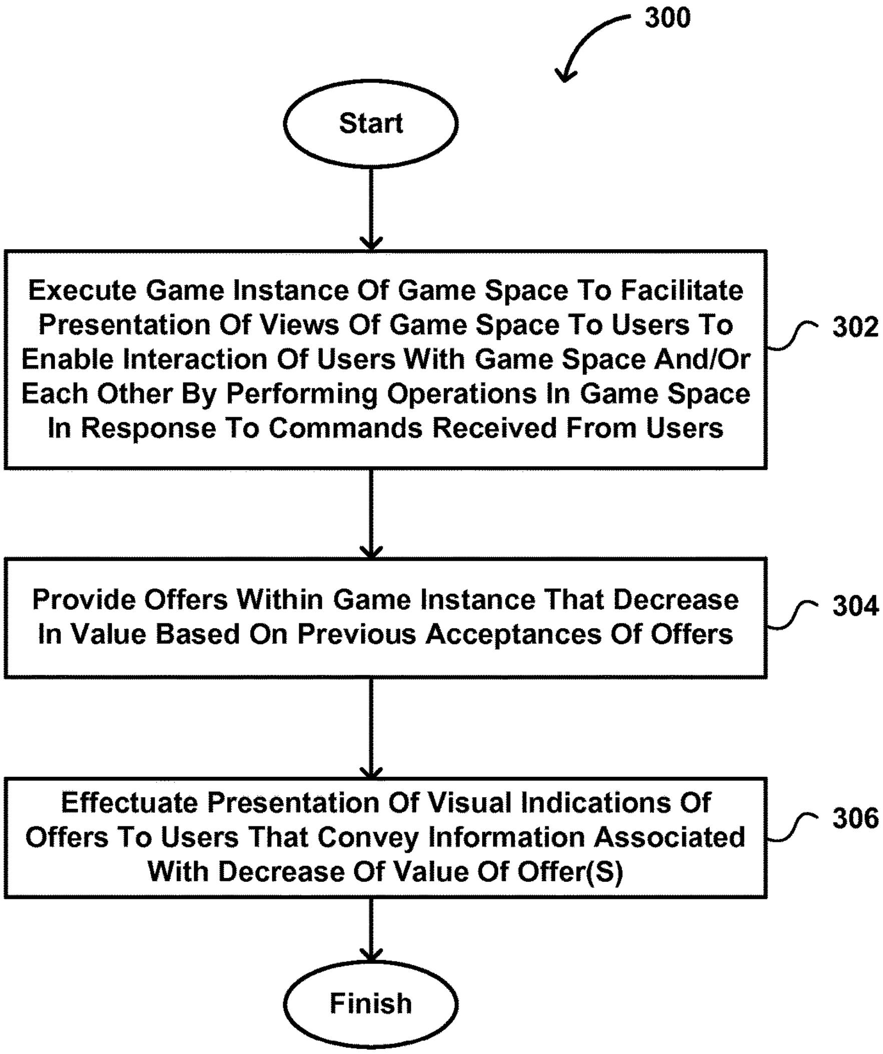
FIG. 3 illustrates a method for providing offers within a game space that decrease in value based on previous acceptances of the offers, in accordance with one or more implementations.

FIG. 3 illustrates a method 100 for providing offers within a game space that decrease in value based on previous acceptances of the offers, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a game instance of a game space may be executed to facilitate presentation of views of the game space to users to enable interaction of the users with the game space and/or each other by performing operations in the game space in response to commands received from the users. Operation 302 may be performed by one or more processors configured to execute a game component that is the same as or similar to a game component 108, in accordance with one or more implementations.

At an operation 304, offers may be provided within the game instance of the game space that decrease in value based on previous acceptances of the offers. The offers may include a first offer having a first value that progressively decreases based on an amount of users that have previously accepted the first offer in order to incentivize early acceptance of the first offer. Operation 304 may be performed by one or more processors configured to execute an offer component that is the same as or similar to offer component 110, in accordance with one or more implementations.

At an operation 306, presentation may be effectuated of visual indications of offers to users of the game instance of the game space. The visual indications may include a first visual indication of the first offer. The first visual indication may convey information associated with the decrease of the first value of the first offer. Operation 306 may be performed by one or more processors configured to execute an offer presentation component that is the same as or similar to offer presentation component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing offers within a game space that decrease in value based on previous acceptances of the offers, the system comprising one or more processors configured by non-transitory computer readable instructions to:

execute a game instance of a game space to facilitate presentation of views of the game space to users to enable interaction of the users with the game space and/or each other by performing operations in the game space in response to commands received from the users; and provide offers within the game instance of the game space that decrease in value based on previous acceptances of the offers such that the value, which is to be received by the users that accept that offers in exchange for an amount of consideration, decreases progressively based on the previous acceptances of the offers by other users without decreasing the amount of consideration exchanged by the users, the offers including a first offer having a first value that progressively decreases based on an amount of users that have previously accepted the first offer in order to incentivize early acceptance of the first offer such that the value to be received by the first user upon acceptance of the first offer progressively decreases based on the amount of the other users that have previously accepted the first offer without decreasing the amount of consideration to be exchanged by the first user for the first offer.

2. The system of claim 1, wherein the first offer is a chance-based offering such that accepting the first offer includes obtaining a chance to win a prize associated with the first offer based on luck.

3. The system of claim 2, wherein the amount of users that have previously accepted the first offer includes a number of users that have previously obtained a chance to the win the prize associated with the first offer.

4. The system of claim 2, wherein the value of the first offer includes a quantity associated with the prize such that a first user winning the prize will gain more virtual items associated with the prize relative to a second user winning the prize after the first user.

5. The system of claim 2, wherein the value of the first offer includes odds of winning the prize such that a first user obtaining a chance to win the prize will have better odds of winning relative to a second user obtaining a chance to win the prize after the first user.

6. The system of claim 2, wherein the value of the first offer includes a price associated with obtaining a chance to win the prize such that a first user purchasing a chance will pay less relative to a second user purchasing a chance after the first user.

7. The system of claim 1, wherein the first offer is for a virtual item such that accepting the first offer includes purchasing the virtual item.

8. The system of claim 7, wherein the amount of users that have previously accepted the first offer includes a number of users that have previously purchased the virtual item.

9. The system of claim 7, wherein the value of the first offer includes a quantity associated with the virtual item such that a first user purchasing the virtual item will gain more of the virtual item relative to a second user purchasing the virtual item after the first user.

10. The system of claim 7, wherein the value of the first offer includes a price associated with the virtual item such that a first user purchasing the virtual item will pay less relative to a second user purchasing the virtual item after the first user.

11. The system of claim 1, wherein the offers further include a second offer such that the first value of the first offer progressively decreases based on an amount of users that have previously accepted either the first offer or the second offer.

12. The system of claim 1, wherein the first value of the first offer decreases for a second group of users and remains the same for a second group of users.

13. The system of claim 1, wherein the decrease in the first value of the first offer occurs with individual acceptances of the first offer.

14. The system of claim 1, wherein the decrease in the first value of the first offer is tiered based on successive sets of acceptances.

15. The system of claim 1, wherein the one or more processors are further configured by non-transitory computer readable instructions to effectuate presentation of visual indications of offers to users of the game instance of the game space, the visual indications including a first visual indication of the first offer, the first visual indication conveying information associated with the decrease of the first value of the first offer.

16. The system of claim 15, wherein the information associated with the decrease of the first value of the first offer includes one or more of:

a visual illustration of a decreasing pool of chances to win, prizes, or virtual items associated with the first offer;

an indication of a total number of users that have accepted the first offer; or an indication of a total number of remaining chances to win, prizes, or virtual items associated with the first offer.

17. A computer-implemented method for providing offers within a game space that decrease in value based on previous acceptances of the offers, the method being performed by one or more processors configured by non-transitory computer readable instructions, the method comprising executing, at one or more processors, a game instance of a game space to facilitate presentation of views of the game space to users to enable interaction of the users with the game space and/or each other by performing operations in the game space in response to commands received from the users; and providing, at one or more processors, offers within the game instance of the game space that decrease in value based on previous acceptances of the offers such that the value, which is to be received by the users that accept that offers in exchange for an amount of consideration, decreases progressively based on the previous acceptances of the offers by other users without decreasing the amount of consideration exchanged by the users, the offers including a first offer having a first value that progressively decreases based on an amount of users that have previously accepted the first offer in order to incentivize early acceptance of the first offer such that the value to be received by the first user upon acceptance of the first offer progressively decreases based on the amount of the other users that have previously accepted the first offer without decreasing the amount of consideration to be exchanged by the first user for the first offer.

18. The method of claim 17, wherein the first offer is either:

a chance-based offering such that accepting the first offer includes obtaining a chance to win a prize associated with the first offer based on luck; or for a virtual item such that accepting the first offer includes purchasing the virtual item.

19. The method of claim 17, further comprising effectuating, at one or more processors, presentation of visual indications of offers to users of the game instance of the game space, the visual indications including a first visual indication of the first offer, the first visual indication conveying information associated with the decrease of the first value of the first offer.

20. The method of claim 19, wherein the information associated with the decrease of the first value of the first offer includes one or more of:

a visual illustration of a decreasing pool of chances to win, prizes, or virtual items associated with the first offer;

an indication of a total number of users that have accepted the first offer; or an indication of a total number of remaining chances to win, prizes, or virtual items associated with the first offer.

* * * * *